United States Patent [19]

Pecci

[11] 4,385,884
[45] May 31, 1983

[54] GRANULATION CHAMBER FOR PLASTICS MATERIALS

[76] Inventor: Giorgio Pecci, Via Curiel, 15, S. Maria Maddalena, (Province of Rovigo), Italy

[21] Appl. No.: 228,660

[22] Filed: Jan. 26, 1981

[30] Foreign Application Priority Data

Jan. 29, 1980 [IT] Italy ................... 4727/80[U]

[51] Int. Cl.³ .............................................. B29C 17/14
[52] U.S. Cl. .................................. 425/313; 264/142; 425/378 R
[58] Field of Search .................. 425/313, 378 R, 311; 269/142

[56] References Cited

U.S. PATENT DOCUMENTS

| | | | |
|---|---|---|---|
| 1,210,097 | 12/1916 | Perry et al. ........................... | 264/8 |
| 2,356,599 | 8/1944 | Landgraf ............................... | 264/8 |
| 2,439,772 | 4/1948 | Gow ....................................... | 264/8 |
| 3,230,582 | 1/1966 | Hoffman et al. ..................... | 425/311 |
| 3,324,510 | 6/1967 | Kleeb .................................... | 425/311 |
| 3,452,394 | 7/1969 | McNeal ................................. | 425/311 |
| 4,046,497 | 9/1977 | Newman ............................... | 425/313 |
| 4,099,900 | 7/1978 | Bradburg ............................. | 425/313 |
| 4,150,595 | 4/1979 | Loffler et al. ....................... | 425/313 |
| 4,245,972 | 1/1981 | Anders .................................. | 425/313 |
| 4,249,879 | 2/1981 | Anders et al. ....................... | 425/313 |
| 4,300,877 | 11/1981 | Anderson ............................. | 264/142 |

Primary Examiner—Jay H. Woo
Attorney, Agent, or Firm—Guido Modiano; Albert Josif

[57] ABSTRACT

A granulation chamber for plastics materials comprises a top portion effective to be rotated symmetrically about a vertical axis and having a downwardly divergent concave shape, an opening located at the center of the top portion and engaged by an extruder head associated with a star arrangement of granulating knives to be rotated in a horizontal plane intersecting the top portion and a frusto-conical hopper-like bottom portion coupled with the top portion and converging downwardly into a discharge outlet.

2 Claims, 1 Drawing Figure

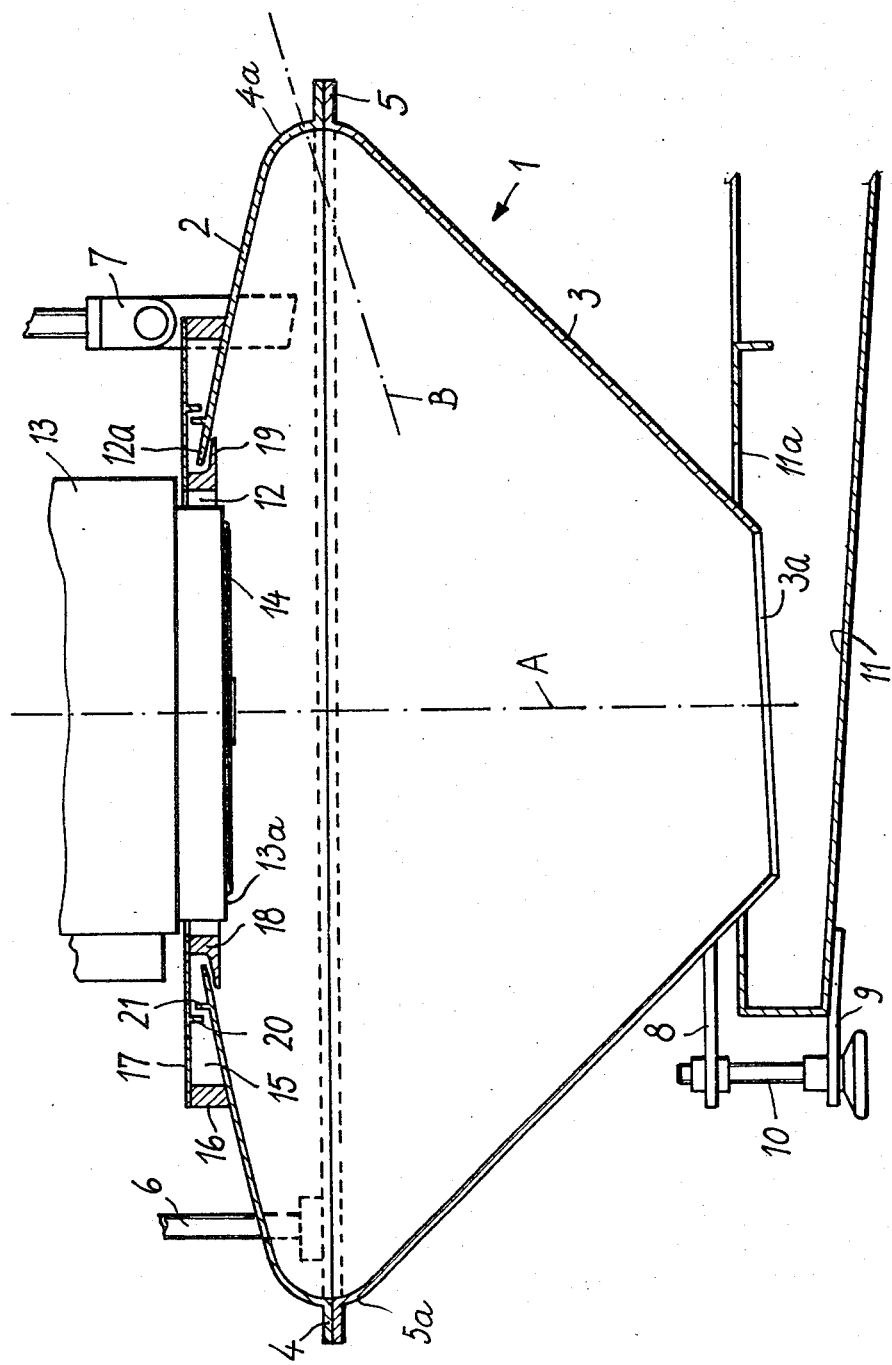

GRANULATION CHAMBER FOR PLASTICS MATERIALS

BACKGROUND OF THE INVENTION

This invention relates to a granulation chamber for plastics materials, wherein the plastics material is extruded from an extruder head and granulated by means of a rotary star or spider arrangement of knives which is connected frontally to the extruder head.

Known are granulating chambers which comprise a hollow space of cylindrical shape, the top base whereof carries an extrusion head for the product to be granulated. Said head comprises an extrusion plate having orifices wherethrough the product, in a "spaghetti" form, is caused to emerge vertically continuously. A plurality of rotary knives arranged in a star or spider configuration are caused to shave the plate and cut into granules the product which is projected by centrifugal force against the walls of the granulating chamber. With certain products, the inner wall of the chamber is wet with a film of water which is effective to cool down the granules and prevent them from sticking to the wall.

In order to improve the output of such apparatus, one endeavors to increase the cutting rate as far as possible. However, above a certain speed range (above about 800 rpm's) the granules tend to rebound against the chamber walls and interfere with the successively formed granules, thus resulting in a mutual sticking condition.

SUMMARY OF THE INVENTION

This invention sets out to obviate the cited drawback, that is to provide a chamber wherein the granules are prevented from sticking to one another even at high operational speeds or rates.

This aim is achieved by a granulation chamber for plastics materials, wherein the plastics material is extruded from an extruder head and granulated by a rotating star arrangement of knives, frontally associated with said head, characterized in that it comprises a top portion effective to be rotated symmetrically about a vertical axis and having a downwardly divergent concave shape, an opening located at the center of said portion and engaged by said extruder head, thereby the star of knives is rotated in a horizontal plane intersecting said top portion, there being also provided a frusto-conical bottom portion coupled with said top portion and converging downwardly into a discharge outlet.

BRIEF DESCRIPTION OF THE DRAWING

One embodiment of the invention is illustrated in the accompanying drawing, the one FIGURE whereof shows an elevational and sectional view of a granulating chamber according to the invention.

DESCRIPTION OF THE PREFERRED EMBODIMENTS

In the drawing FIGURE, the granulating chamber is generally indicated at 1. The chamber comprises a top or upper portion or cover 2 and a bottom or lower portion or hopper 3, which portions are provided with respective peripheral flanges 4,5 for their mutual fastening by means of screws. The cover 2 and hopper 3 are rotated symmetrically about a vertical axis A. More specifically, the hopper 3 has a substantially frusto-conical shape which converges downwards, with the wall thereof forming a substantially 45° angle with the axis A, the cover 2 is concave or hollow toward the interior of the chamber 1 and merges with the top of the hopper 3 to define complementary therewith a substantially parabola-like contour having an axis B which forms a 60° angle with the axis A of the granulating chamber.

The chamber is suspended through tie rods 6,7 from a stationary frame, not shown in the drawing. The tie rods 7 are suitably hinged to allow a certain tilting movement of the chamber with respect to the axis A. The hopper 3 has a bottom outlet 3a for discharging the granulated product. Externally to said outlet, there is welded a bracket 8 wherein a screw 10 is engaged which also engages a second bracket 9 rigid with a container 11 located under the discharge outlet 3a. The container has an inclined bottom for the removal of the product and water.

The cover or lid 2 has at the center a circular opening 12 bordered by a rim 12a, in which opening there engages an extrusion head 13 with an extrusion outlet 13a and a cutting assembly including a star arrangement of knives 14 which rotates about the axis A. The rotation plane of the knives 14 intersects the cover close to the rim 12a. Around the opening 12, there is formed an annular space 15 which is connected to a cooling water supply. The space 15 is formed from a tubular element 16 which is welded externally to the cover, whereon a ring-like plate 17 is welded. To the inner edge of the plate 17, there is welded a collar 18 which extends into the opening 12 and has an outer flange 19 which defines, together with the edge 12a of the cover, a flattened annular mouth adapted for forming a film of water directed against the chamber wall. With the opposite faces of the plate 17 and rim 12a of the cover, there are rigidly connected respective annular ridges 20,21 which form a labyrinth adapted to allow the building up of a certain pressure within the space 15, for a uniform distribution of the water.

As may be seen, the shape of the chamber prevents the granules of the product from rebounding towards the axis A, after being cut by the knives 14 and thrown outwardly, and thereby prevents them from sticking to other granules which have been cut in the meantime. In addition thereto, the inclination of the cover encourages a radially diverging flow of the granules, thereby any mutual contact is prevented as much as possible.

What is claimed is:

1. A granulating apparatus, comprising an extruder head with an extrusion outlet having a vertical axis with a downward direction of extrusion, a rotating star arrangement of knives below and close to said extrusion outlet for cutting granules of plastics material extruded from said extruder head, a granulating chamber arranged below said extrusion outlet and having a lower portion and an upper portion connected therewith, said lower portion having a frusto-conical shape coaxial with said axis and converging downwardly into a discharge outlet, and said upper portion having upwardly an opening with a rim and a substantially frusto-conical shape converging upwardly into said opening having said rim surrounding said extruder head, wherein the apparatus further comprises a collar defining an annular space extending around said opening and connected to a water supply for cooling the granules, said collar internally delimiting said annular space and extending into said opening and having an outer flange member defining with the rim of said opening an annular mouth for creating a water film streaming along the inner surface of said upper chamber portion and wherein the star of knives is arranged to rotate in a plane intersecting said upper chamber portion.

2. An apparatus as claimed in claim 1, wherein annular ridges are arranged in said annular space, said ridges defining a labyrinth adapted for enabling the building up of a water pressure within said annular space.

* * * * *